United States Patent Office 3,117,985
Patented Jan. 14, 1964

3,117,985
FLUOROALKYLTHIO-SUBSTITUTED THIOCYANATES AND THEIR PREPARATION
Stephen Proskow, Claymont, Del., assignor to E. I. du Pont de Nemours and Company, Wilmington, Del., a corporation of Delaware
No Drawing. Filed Feb. 28, 1961, Ser. No. 92,125
10 Claims. (Cl. 260—454)

This invention relates to, and has as its principal objects provision of, novel fluoroalkyl thiocyanates and methods for their preparation.

The discovery of the effectiveness of certain organic thiocyanates as contact insecticides and parasiticides has stimulated considerable research interest in this class of compounds. Among the thiocyanates which have been found effective are those of the higher aliphatic alcohols, e.g., lauryl thiocyanate (U.S. 1,993,040), esters of acids containing the —CNS group (U.S. 2,112,688), cycloalkyl thiocyanates (U.S. 2,122,781), α,ω-thiocyanoalkanols (U.S. 2,620,290), monocarboxylic acid esters of α,ω-thiocyanoalkanols (U.S. 2,467,235), etc. These thiocyanates all embody the attributes of pyrethrum to some degree.

This invention provides a new class of fluoroalkyl-substituted thiocyanates which correspond in structure to:

$$\begin{array}{c} H-C-SCN \\ (S)_n \diagdown S \\ | \quad | \\ CF_2 \quad Y \\ | \\ X \end{array}$$

wherein: $n$ is 0 or 1; X is hydrogen, halogen of atomic number 9–53, or polyhaloalkyl (all halogen being of atomic number 9–53) or alkyl of up to 30 carbons, preferably of up to 18; and Y is polyfluoroalkyl containing up to 30 carbons, preferably up to 18, and carrying at least 2 fluorines on the carbon adjacent to sulfur; with the provisos (1) that, when $n$ is zero, Y can additionally be aryl of up to 8 carbons (e.g., phenyl, xylyl, etc.) or alkyl of up to 30 carbons and (2) that X and Y can be joined together to form a cyclic system of up to 5 atoms.

The fluoroalkyl-substituted thiocyanates of this invention are made by the addition of hydrogen cyanide to a haloalkyl trithiocarbonate or a haloalkyl dithioester. In this reaction the hydrogen cyanide employed may be either preformed or formed in situ from precursors. When preformed hydrogen cyanide is used, an alkali metal fluoride is also included in the reaction charge. Although the alkali metal fluoride seems to be essential its exact role in the reaction is not precisely known yet. The alkali metal fluoride is not necessary when the hydrogen cyanide is formed in situ from precursors, e.g., glacial acetic acid and an alkali metal cyanide. The haloalkyl trithiocarbonate or dithioester employed may also be preformed or formed in situ from suitable precursors.

The following general equations, in which X and Y have the significance attributed above, summarize the reactions of the invention:

(1) Starting with a preformed trithiocarbonate or dithioester:

(a) $X-CF_2-S-\underset{\underset{S}{\|}}{C}-SY + (KCN + AcOH) \longrightarrow \begin{array}{c} S-CF_2-X \\ | \\ H-C-SCN \\ | \\ SY \end{array}$ (b) $X-CF_2-S-\underset{\underset{S}{\|}}{C}-SY + NaF + HCN \longrightarrow \begin{array}{c} S-CF_2-X \\ | \\ H-C-SCN \\ | \\ SY \end{array}$ (c) $X-CF_2-\underset{\underset{S}{\|}}{C}-SY + (KCN + AcOH) \longrightarrow \begin{array}{c} CF_2-X \\ | \\ H-C-SCN \\ | \\ SY \end{array}$ (d) $X-CF_2-\underset{\underset{S}{\|}}{C}-SY + NaF + HCN \longrightarrow \begin{array}{c} CF_2-X \\ | \\ H-C-SCN \\ | \\ SY \end{array}$ (2) Starting with a fluoroalkyl thioacyl fluoride as a precursor and forming a dithioester in situ (Ex. III below):

(e) $2X-CF_2-\underset{\underset{S}{\|}}{C}-F + HCN + NaF \longrightarrow$ $[X-CF_2-\underset{\underset{S}{\|}}{C}-S-CF_2-CF_2-X] \longrightarrow \begin{array}{c} CF_2-X \\ | \\ H-C-SCN \\ | \\ S \\ \diagdown \\ CF_2-CF_2-X \end{array}$ (3) Starting with thiocarbonyl fluoride as a precursor and forming trithiocarbonate in situ (Ex. II):

(f) $3F-\underset{\underset{S}{\|}}{C}-F + HCN + NaF \longrightarrow$ $[F_3C-S-\underset{\underset{S}{\|}}{C}-S-CF_3] \longrightarrow \begin{array}{c} SCF_3 \\ | \\ H-C-SCN \\ | \\ SCF_3 \end{array}$ It will be observed from the equations above that, when a trithiocarbonate, or appropriate precursors, is employed, the products have the formula:

$$\begin{array}{c} H-C-SCN \\ S \diagup \diagdown S \\ | \quad | \\ CF_2 \quad Y \\ | \\ X \end{array}$$

i.e., $n$ in the general formula is 1. When a dithioester, or precursors, is used, the formula of the products is:

$$\begin{array}{c} H-C-SCN \\ \diagup \diagdown \\ CF_2 \quad S \\ | \quad | \\ X \quad Y \end{array}$$

i.e., $n$ in the general formula is 0.

In accomplishing the processes of the equations given, process variables are not really sharply critical.

When hydrogen cyanide is formed in situ, the fluoroalkyl dithioester or fluoroalkyl trithiocarbonate is dissolved in glacial acetic acid, an alkali metal cyanide is added, and the mixture is allowed to stand at room temperature until decolorization of the reaction mixture occurs, which may require from 1 to 40 hours. The reaction mixture is poured into water and the product is extracted with ether. The ether extract is fractionally distilled to isolate the desired fluoroalkylthio-substituted thiocyanate, after removal of the extracting solvent.

Temperatures are not particularly important when the hydrogen cyanide is formed in situ. In general, however (see detailed Example I, below), temperatures ranging from −10° C. up to +100° C. can be used. As a rule, the best results are obtained operating at temperatures of from −0° C. to +30° C.

Use of a normally liquid organic acid is essential when the hydrogen cyanide is formed in situ. Glacial acetic acid is particularly desirable since it can serve as a reaction medium as well. Other organic acids which can be used are formic, propionic, and the like.

When preformed hydrogen cyanide is used, the fluoroalkyl dithioester or fluoroalkyl trithiocarbonate, or precursors thereof, is charged into a reactor cooled to about −75° C., i.e., the temperature of solid carbon dioxide-acetone, along with hydrogen cyanide and alkali metal fluoride. The mixture is allowed to react for from 12 to 48 hours. Thereafter the reaction mixture is treated with diethyl ether, filtered, and the filtrate distilled. After removal of the ether, the pressure is reduced and the distillation continued under reduced pressure to isolate the desired product.

While sodium fluoride is conveniently the fluoride of choice in the above reaction, it will be readily apparent that other alkali metal fluorides such as those of potassium, lithium, rubidium and cesium can be substituted therefor. The quantity of alkali metal fluoride is usually equimolar.

Temperature can also be varied to some extent when preformed hydrogen cyanide is used. Generally this will be in the range from about −75° C. to +100° C. and usually from −25° C. to +30° C.

Use of a reaction medium with preformed hydrogen cyanide is not necessary. Such a medium can, however, be used if desired, for example, glacial acetic acid, acetonitrile, methylene chloride, and the like. When a reaction medium is used, it can equal in weight the thioacyl fluoride or other reactant or exceed the same by many fold.

Quantities of reactants employed are largely matters of choice in all variations of the process. The ratio of hydrogen cyanide to the other reactant (or precursors) can vary widely. A ratio in the range of 5:1 to 1:1 will generally be used, about 1:1 being most usual.

The pressure conditions in all process variations are likewise largely matters of choice. Thus pressure can be atmospheric but is autogenous when a closed reaction system is used. Closed systems will obviously be used at the higher temperatures. If desired, externally applied pressures can be used but have no practical advantage, rather complicating equipment design, in fact.

The example which follow are submitted to illustrate but not to limit this invention. In particular, the equations are not intended to be limiting to any theory of operation. In these examples, pressures are ambient atmospheric unless otherwise specified.

EXAMPLE I

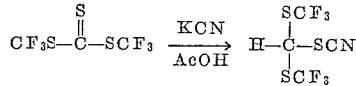

A solution of 11.5 g. of bis(trifluoromethyl)tri-thiocarbonate in 50 ml. of glacial acetic acid was stirred and maintained at 0° C. to 15° C. while 5 g. of potassium cyanide was added in portions during 0.5 hour. The mixture was stirred at 0° to 15° C. an additional half hour and then allowed to warm to room temperature. When the deep color of the bis(trifluoromethyl)trithiocarbonate had been discharged, the reaction mixture was poured into cold water and the product extracted with diethyl ether. The ether extract was then tried over anhydrous magnesium sulfate. Removal of the ether, followed by fractional distillation of the residue, yielded 8 g. of a clear, colorless liquid, B.P. 52° C./4.5 mm., $n_D^{24}$, 1.4329. This liquid was characterized as bis(trifluoromethylthio)methylthiocyanate by fluorine nuclear magnetic resonance and infrared analysis, the data being identical in every respect with that of the product in Example II.

EXAMPLE II

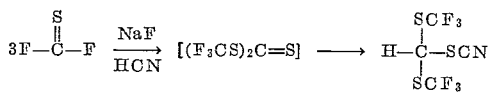

A 145 ml. stainless steel pressure reactor was cooled to −80° C. and charged with 31.5 g. of sodium fluoride, 10 ml. of hydrogen cyanide, and 20.5 g. of thiocarbonyl fluoride. The charge was then allowed to stand at room temperature for 20 hours, evacuated, and the reactor was then opened. The contents of the reactor were extracted with diethyl ether and the extract transferred to a still. After removal of the ether, the residue (ca. 10 g.) was fractionally distilled, giving 4 g. of bis(trifluoromethylthio)methyl thiocyanate as a pale yellow liquid, B.P. 43° C./3.25 mm.

Analysis.—Calc'd. for $C_4HF_6NS_3$: C, 17.58%; H, 0.37%; F, 41.71%; N, 5.13%. Found: C, 17.88%; H, 0.79%; F, 42.56%; N, 5.42%.

The structure of the product was confirmed by infrared analysis that indicated the presence of unsaturated CH (3.4μ), SCN (4.6μ), and $SCF_3$ (13.15μ) groups, and by a single fluorine nuclear magnetic resonance at −2013 cycles per second relative to trifluoroacetic acid at zero. This single fluorine resonance demonstrates presence of only one kind of fluorine and indicates the existence of —$SCF_3$ groups in the compound. The n-m-r spectrum was obtained by means of a Varian High Resolution nuclear magnetic resonance spectrometer and associated electromagnet operating at 56.4 Mc and approximately 15,000 gauss.

In Example II bis(trifluoromethyl)trithiocarbonate has been formed in situ by reaction of sodium fluoride and hydrogen cyanide with thiocarbonyl fluoride. Instead of forming the ester in situ, preformed ester can be employed as illustrated in Example I. These trithiocarbonate esters can be made by reacting thiocarbonyl fluoride with a thiol in the presence of an alkali metal fluoride. They can also be made by reacting thiophosgene with a compound of the type $Hg(R_fS)_2$. The mixed trithiocarbonate may be prepared by similar methods using trifluoromethyl fluorodithioformate as the starting material.

EXAMPLE III

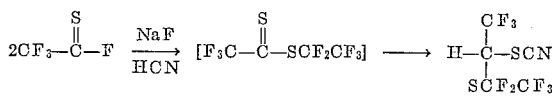

A reactor, fitted with a solid carbon dioxide-acetone cooled reflux condenser, was charged with 7 g. of hydrogen cyanide and 30 g. of trifluoromethylthioacetyl fluoride. The charge was allowed to reflux, and to the refluxing mixture there was added 18.5 g. of sodium fluoride portionwise. After all of the sodium fluoride had been added, the reaction mixture was allowed to stand overnight. The mixture was stirred with diethyl ether, filtered, and the filtrate submitted to distillation. After removal of the ether at atmospheric pressure, the pressure was lowered, and a fraction, B.P. ca. 60° C./15 mm., was collected. This weighed ca. of 6 g. and was slightly impure 1-pentafluoroethylthio-2,2,2-trifluoroethyl thiocyanate. Careful fractionation gave pure material, B.P. 58.5–59.5° C./16 mm.

Anal.—Calcd. for $C_5HF_8NS$: C, 20.63%; H, 0.35%; N, 4.81%; S, 22.03%. Found: C, 21.27%; H, 0.45%; N, 5.32%; S, 22.36%.

The structure of the product was confirmed by infrared analysis that indicated the presence of saturated —CH, (3.35μ) and —SCN (4.6μ), and by three fluorine nuclear magnetic resonances in the ratio of 2:3:3, of which one of the larger peaks was split into a doublet. The three fluorine resonances indicate the presence of three different kinds of fluorine in the ratio of 2:3:3. Hence, the deduction that the groups are —$CF_3$ and —$SCF_2$—$CF_3$ is reasonable. The split of one of the larger peaks to a doublet indicates that one of the —$CF_3$ groups is adjacent to a carbon bearing hydrogen.

The trifluoromethylthioacetyl fluoride used in the above example is conveniently made by reacting tetrafluoroethylene with mercuric fluoride, followed by treatment of the resulting mercury derivative with sulfur at high temperatures. Schematically the reaction of formation of the trifluoromethyl-thioacetyl fluoride is represented by the following equations:

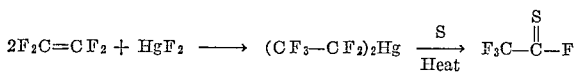

In place of the trifluoromethylthioacetyl fluoride of

Example III, there can be used any alpha, alpha-difluorothioacyl fluoride which when reacted with sodium fluoride and hydrogen cyanide will dimerize to give a dithioester. These alpha, alpha-difluorothioacyl fluorides can be made from perhaloalkyl mercaptans or perhaloalkenes, as exemplified by the following equations:

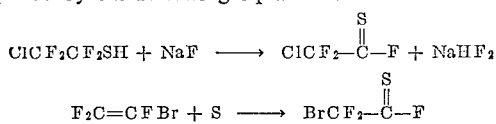

Preformed dithioesters which, of course, can be used in place of the precursors exemplified, can be made by reaction of a thiol of the formula RSH, where R is alkyl or haloalkyl, and an alkali metal fluoride MF, where M is an alkali metal, with a compound of the formula $R_fCF_2SH$ or $R_fCSF$, where $R_f$ is a haloalkyl radical having fluorine on the alpha carbon. The reactions involved are illustrated by the following equations:

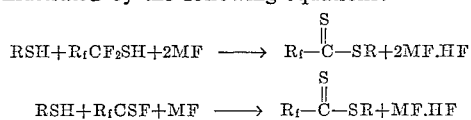

Additional examples are evident from the tables below. If the dithioesters listed in the left column of the Table I are reacted with hydrogen cyanide in the presence of alkali metal fluoride or by the acetic acid-alkali metal cyanide procedure, the products shown in the right column will be obtained.

Table I

| Dithioester | Product |
|---|---|
| $F_3C-\overset{S}{\underset{\|}{C}}-SCH_2CH_3$ | $F_3C-\overset{SCN}{\underset{H}{C}}-SCH_2CH_3$ |
| $ClF_2C-\overset{S}{\underset{\|}{C}}-SCH_2CH_3$ | $ClF_2C-\overset{SCN}{\underset{H}{C}}-SCH_2CH_3$ |
| $ClF_2C-\overset{S}{\underset{\|}{C}}-S-\langle\rangle$ | $ClF_2C-\overset{SCN}{\underset{H}{C}}-S-\langle\rangle$ |
| $F_3C-\overset{S}{\underset{\|}{C}}-SCF_3$ | $F_3C-\overset{SCN}{\underset{H}{C}}-SCF_3$ |
| $HF_2C-\overset{S}{\underset{\|}{C}}-SC_4H_9$ | $HF_2C-\overset{SCN}{\underset{H}{C}}-SC_4H_9$ |
| $F_3C-CF_2-\overset{S}{\underset{\|}{C}}-SC_3H_7$ | $F_3C-CF_2-\overset{SCN}{\underset{H}{C}}-SC_3H_7$ |
| $H_3C-CH_2-CH_2-CF_2-\overset{S}{\underset{\|}{C}}-SC_2H_5$ | $H_3C-CH_2-CH_2-CF_2-\overset{SCN}{\underset{H}{C}}-SC_2H_5$ |
| $\begin{array}{c}CF_2-C=S \\ \| \quad \| \\ CF_2 \quad S \\ \diagdown CF_2 \diagup \end{array}$ | $\begin{array}{c}CF_2-\overset{SCN}{\underset{H}{C}} \\ \| \qquad \| \\ CF_2 \quad S \\ \diagdown CF_2 \diagup \end{array}$ |
| $ClCF_2CF_2-\overset{S}{\underset{\|}{C}}-SC_2H_5$ | $ClCF_2CF_2-\overset{SCN}{\underset{H}{C}}-S-C_2H_5$ |
| $ClCF_2-CF_2-CF_2-CF_2-\overset{S}{\underset{\|}{C}}-SC_2H_5$ | $ClCF_2-CF_2-CF_2-CF_2-\overset{SCN}{\underset{H}{C}}-SC_2H_5$ |

Table I—Continued

| Dithioester | Product |
|---|---|
| $BrCF_2-\overset{S}{\underset{\|}{C}}-SC_2H_5$ | $BrCF_2-\overset{SCN}{\underset{H}{C}}-SC_2H_5$ |
| $F_3C-\overset{S}{\underset{\|}{C}}-S-CH_2-(CF_2)_4H$ | $F_3C-\overset{SCN}{\underset{H}{C}}-S-CH_2-(CF_2)_4H$ |
| $F_3C-\overset{S}{\underset{\|}{C}}-S-\overset{C_2F_5}{\underset{C_2F_5}{C}}-H$ | $CF_3-\overset{SCN}{\underset{H}{C}}-S-\overset{C_2F_5}{\underset{C_2F_5}{C}}-H$ |
| $F_3C-\overset{S}{\underset{\|}{C}}-S-CH_2-(CF_2)_5-CF_3$ | $F_3C-\overset{SCN}{\underset{H}{C}}-S-CH_2-(CF_2)_5-CF_3$ |
| $ClF_2C-\overset{S}{\underset{\|}{C}}-S-CF_2-CF_2Cl$ | $ClF_2C-\overset{SCN}{\underset{H}{C}}-S-CF_2-CF_2Cl$ |

If the trithiocarbonates listed in the left column of Table II are used either in the process of Example I, instead of bis(trifluoromethyl)trithiocarbonate, or are reacted with hydrogen cyanide in the presence of an alkali metal fluoride, the product shown in the right column will be obtained.

Table II

| Trithiocarbonate | Product |
|---|---|
| $(F_3C-CF_2-CF_2-S)_2C=S$ | $(F_3C-CF_2-CF_2-S)_2-\overset{SCN}{\underset{\|}{C}}-H$ |
| $(ClF_2C-CF_2-S)_2C=S$ | $(ClF_2C-CF_2-S)_2\overset{SCN}{\underset{\|}{C}}-H$ |
| $(ClF_2CS)_2C=S$ | $(ClF_2CS)_2-\overset{\|}{\underset{SCN}{C}}-H$ |
| $(BrF_2CS)_2C=S$ | $(BrF_2CS)_2-\overset{\|}{\underset{SCN}{C}}-H$ |
| $(HF_2CS)_2C=S$ | $(HF_2CS)_2-\overset{\|}{\underset{SCN}{C}}-H$ |
| $(H_3C-CH_2-CH_2-CF_2S)_2C=S$ | $(H_3C-CH_2-CH_2-CF_2S)_2-\overset{\|}{\underset{SCN}{C}}-H$ |
| $(HClCFCF_2S)_2C=S$ | $(HClCFCF_2S)_2\overset{SCN}{\underset{\|}{C}}-H$ |
| $(HCF_2-CF_2S)_2C=S$ | $(HCF_2-CF_2-S)_2\overset{SCN}{\underset{\|}{C}}-H$ |
| $F_3CS-\overset{S}{\underset{\|}{C}}-SCF_2CF_2CF_3$ | $F_3CS-\overset{SCN}{\underset{H}{C}}-SCF_2CF_2CF_3$ |

The products of this invention are highly valuable in all applications in which thiocyanates are known to be useful. These products also find utility as soil disinfectants, as illustrated below:

Two aliquots of Rhizoctonia-infested soil were taken. To one aliquot there was added a 5% acetone solution of bis(trifluoromethylthio)methyl thiocyanate, prepared as in Example I, at the rate of 100 p.p.m., and the other aliquot was treated with an equal amount of acetone. The soils were allowed to stand in closed containers for 24 hours, and were then uncovered and allowed to aerate for another 24 hours. Thereafter the two samples of soil were planted with green snap beans. Examination of the plants after ten days showed that the plants growing in the soil treated with acetone were diseased with Rhizoctonia. In contrast, the plants in the soil which had been treated with bis(trifluoromethylthio)methyl thiocyanate were completely healthy.

Since obvious modifications and equivalents in the invention will be apparent to those skilled in the chemical arts, I propose to be bound solely by the appended claims.

The embodiments of the invention in which an exclusive property or privilege is claimed are defined as follows:

1. Fluoroalkyl thiocyanates selected from the group consisting of

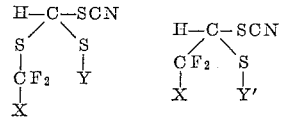

and

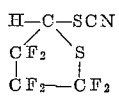

wherein X is selected from the group consisting of hydrogen, halogen of atomic number 9–53 and alkyl and polyhaloalkyl of up to 30 carbons, all halogen being of atomic number 9–53; Y is polyfluoroalkyl of up to 30 carbons having at least 2 fluorines on the carbon vicinal to sulfur, all halogen being of atomic number 9–53; and Y' is selected from the group consisting of polyfluoroalkyl of up to 30 carbons, all halogen being of atomic number 9–53, aryl of up to 8 carbons and alkyl of up to 30 carbons.

2. Bis(trifluoromethylthio)methyl thiocyanate.

3. 1 - pentafluoroethylthio - 2,2,2 - trifluoroethyl thiocyanate.

4. The process of producing a fluoroalkylthio thiocyanate which comprises reacting (1) a trithiocarbonate wherein one of the sulfur atoms which is bonded to the thiocarbonyl,

group by a single bond is attached by a single bond to a polyfluoroalkyl group of up to 30 carbons having at least 2 fluorines on the carbon vicinal to the sulfur and the other sulfur atom which is attached to the thiocarbonyl,

group by a single bond is attached to the radical —CF$_2$—X, X being selected from the group consisting of hydrogen, halogen of atomic number 9–53, and polyhaloalkyl of up to 30 carbons, all halogen being of atomic number 9–53, and (2) an alkali metal cyanide in (3) glacial acetic acid.

5. The process of producing a fluoroalkylthio thiocyanate which comprises reacting (1) a trithiocarbonate wherein one of the sulfur atoms which is bonded to the thiocarbonyl,

group by a single bond is attached to a polyfluoroalkyl group of up to 30 carbons having at least 2 fluorines on the carbon vicinal to the sulfur and the other sulfur atom which is attached to the thiocarbonyl,

group by a single bond is attached to the radical —CF$_2$—X, X being selected from the group consisting of hydrogen, halogen of atomic number 9–53, and polyhaloalkyl of up to 30 carbons, all halogen being of atomic number 9–53, and (2) hydrogen cyanide in (3) the presence of an alkali metal fluoride.

6. The process of producing a fluoroalkylthio thiocyanate which comprises reacting (1) a dithioester wherein the carbon doubly bonded to sulfur is attached to the radical —CF$_2$X, X being selected from the group consisting of hydrogen, halogen of atomic number 9–53 and perhaloalkyl of up to 30 carbons, all halogen being of atomic number 9–53, and the sulfur which is attached to the thiocarbonyl,

group by a single bond is attached by a single bond to a member of the group consisting of polyfluoroalkyl of up to 30 carbons, aryl of up to 8 carbons, and alkyl of up to 30 carbons and (2) an alkali metal cyanide in (3) glacial acetic acid.

7. The process of producing a fluoroalkylthio thiocyanate which comprises reacting (1) a dithioester wherein the carbon doubly bonded to sulfur is attached to the radical —CF$_2$X, X being selected from the group consisting of hydrogen, halogen of atomic number 9–53 and perhaloalkyl of up to 30 carbons, all halogen being of atomic number 9–53, and the sulfur which is attached to the thiocarbonyl,

group by a single bond is joined by a single bond to a member of the group consisting of polyfluoroalkyl of up to 30 carbons, aryl of up to 8 carbons and alkyl of up to 30 carbons and (2) hydrogen cyanide in (3) the presence of an alkali metal fluoride.

8. The process of producing 1-pentafluoroethylthio-2,2,2-trifluoroethyl thiocyanate which comprises reacting trifluorothioacetyl fluoride and hydrogen cyanide in the presence of an alkali metal fluoride.

9. The process of producing bis(trifluoromethylthio)-methyl thiocyanate which comprises reacting bis(trifluoromethyl)trithiocarbonate and an alkali metal cyanide in glacial acetic acid.

10. The process of producing bis(trifluoromethylthio)-methyl thiocyanate which comprises reacting thiocarbonyl fluoride with hydrogen cyanide in the presence of an alkali metal fluoride.

No references cited.